US008132382B2

United States Patent
Wagner et al.

(10) Patent No.: US 8,132,382 B2
(45) Date of Patent: *Mar. 13, 2012

(54) INSULATION CONTAINING HEAT EXPANDABLE SPHERICAL ADDITIVES, CALCIUM ACETATE, CUPRIC CARBONATE, OR A COMBINATION THEREOF

(75) Inventors: Christophe Wagner, Lansdale, PA (US); Murray Toas, Norristown, PA (US); Kurt Mankell, Minnetonka, MN (US)

(73) Assignee: Certainteed Corporation, Valley Forge, PA (US)

( * ) Notice: Subject to any disclaimer, the term of this patent is extended or adjusted under 35 U.S.C. 154(b) by 974 days.

This patent is subject to a terminal disclaimer.

(21) Appl. No.: 11/609,052

(22) Filed: Dec. 11, 2006

(65) Prior Publication Data

US 2007/0098973 A1    May 3, 2007

Related U.S. Application Data

(63) Continuation-in-part of application No. 11/195,055, filed on Aug. 2, 2005, which is a continuation-in-part of application No. 10/869,994, filed on Jun. 17, 2004, now abandoned.

(51) Int. Cl.
*E04B 1/74* (2006.01)
(52) U.S. Cl. ...................... 52/407.3; 52/407.5; 52/653.1
(58) Field of Classification Search ................. 52/404.1, 52/407.3, 407.5, 309.12, 343, 344, 653.1, 52/293, 309, 414, 474, 483.1, 633, 745.05, 52/745.09, 745.1, 745.13, 309.17, 783.11, 52/783.17, 783.18, 783.19, 783.14, 783.13, 52/783.15, 287.1, 309.1, 309.4–309.6
See application file for complete search history.

(56) References Cited

U.S. PATENT DOCUMENTS

| | | | |
|---|---|---|---|
| 3,769,126 A | | 10/1973 | Kolek |
| 3,842,020 A | * | 10/1974 | Garrett .............................. 521/54 |
| 4,057,071 A | | 11/1977 | Rhodes |
| 4,237,672 A | * | 12/1980 | Peterson ....................... 52/742.1 |
| 4,286,210 A | | 8/1981 | Ignatjev |
| 4,289,980 A | | 9/1981 | McLaughlin |
| 4,443,258 A | | 4/1984 | Kirkhuff |
| 4,555,447 A | | 11/1985 | Sieloff et al. |
| 4,572,864 A | | 2/1986 | Benson et al. |
| 4,870,535 A | | 9/1989 | Matsumoto |

(Continued)

OTHER PUBLICATIONS

Tianjin Flourish Chemical Co. Ltd (http://www.tjhfe.com/En/ProductShow.asp?ID=102).*

(Continued)

*Primary Examiner* — William Gilbert
(74) *Attorney, Agent, or Firm* — Duane Morris LLP

(57) ABSTRACT

Thermal insulation is provided which includes randomly distributed inorganic fibers and about 5-500 wt. % unexpanded hollow microspheres comprising a polymeric shell having disposed therein a blowing agent or gas, said unexpanded hollow microspheres increasing in size when heated. Also provided is an insulated attic, including a plurality of rafters, an attic floor and a thermal insulation comprising randomly distributed glass fibers in at least about 5 wt. % hollow expanded microspheres having a diameter of 20-140 microns, which have been expanded from about 6-40 microns. The hollow expanded microspheres reduce the thermal conductivity of the thermal insulation by at least about 5%, and have shown improvement up to 19.4% decreased thermal conductivity during tests at loadings from 30% to 257%. Additionally, calcium acetate and cupric carbonate additions to glass fiber insulation products showed improvement by at least about a 1% decrease in thermal conductivity.

9 Claims, 1 Drawing Sheet

U.S. PATENT DOCUMENTS

| | | | |
|---|---|---|---|
| 4,882,485 | A | 11/1989 | Duryea |
| 5,351,415 | A | 10/1994 | Brooks et al. |
| 5,418,257 | A | 5/1995 | Weisman |
| 5,535,945 | A | 7/1996 | Sferrazza |
| 5,539,598 | A | 7/1996 | Denison |
| 5,770,295 | A | 6/1998 | Alderman |
| 5,837,064 | A | 11/1998 | Bowers |
| 5,885,475 | A | 3/1999 | Salyer |
| 5,898,559 | A | 4/1999 | Smith |
| 5,947,646 | A | 9/1999 | Lytle |
| 5,949,635 | A | 9/1999 | Botez |
| 6,012,263 | A | 1/2000 | Church et al. |
| 6,150,945 | A | 11/2000 | Wilson |
| 6,155,020 | A | 12/2000 | Deem |
| 6,262,164 | B1 | 7/2001 | Church et al. |
| 6,329,052 | B1 | 12/2001 | Groh et al. |
| 6,419,171 | B1 | 7/2002 | Takayanagi |
| 6,458,418 | B2 | 10/2002 | Langer et al. |
| 6,503,026 | B1 | 1/2003 | Mitchell |
| 6,507,473 | B2 | 1/2003 | Richie et al. |
| 6,638,984 | B2 | 10/2003 | Soane et al. |
| 6,864,297 | B2 | 3/2005 | Nutt et al. |
| 2003/0040239 | A1 | 2/2003 | Toas et al. |
| 2003/0087576 | A1 | 5/2003 | Yang et al. |
| 2003/0109910 | A1 | 6/2003 | Lachenbruch et al. |
| 2003/0109911 | A1 | 6/2003 | Lachenbruch et al. |
| 2004/0076826 | A1 | 4/2004 | Lee |
| 2005/0025925 | A1 | 2/2005 | O'Connor |
| 2005/0025952 | A1 | 2/2005 | Field et al. |
| 2005/0079352 | A1 | 4/2005 | Glorioso et al. |
| 2006/0257639 | A1 | 11/2006 | Bianchi et al. |

OTHER PUBLICATIONS

Allen et al., "Advances in Microsphere Insulation Systems", 2003 Cryogenic Engineering Conference, pp. 1-8.

Expancel, The Products, Applications, Questions & Answers, Trade Literature, Jul. 6, 2006, pp. 1-8.

Changes of Phase (or State) http://id.mind.net/~mstm/physics/mechanics/energy/heatAndTemperature/changesOfP ..., website accessed May 6, 2004, 4 pages.

"Phase Change Drywall," U.S. Department of Energy, Office of Energy Efficiency and Renewable Energy, Consumer Energy Information: EREC Reference Briefs, Aug. 2002, 5 pages.

"Phase Change Materials for Solar Heat Storage," U.S. Department of Energy, Office of Energy Efficiency and Renewable Energy, Consumer Energy Information: EREC Reference Briefs, Mar. 2003, 6 pages.

Rubitherm® RT 26, Phase Change Material Based on n-Paraffins and Waxes, Innovative PCM's and Thermal Technology Product Information, Rubitherm GmbH, Jun. 20, 2002, 2 pages.

Rubitherm® RT 20, Phase Change Material Based on n-Paraffins and Waxes, Innovative PCM's and Thermal Technology Product Information, Rubitherm GmbH, Aug. 9, 2002, 2 pages.

Rubitherm® RT 27, Phase Change Material Based on n-Paraffins and Waxes, Innovative PCM's and Thermal Technology Product Information, Rubitherm GmbH, Jun. 20, 2002, 2 pages.

Rubitherm® PX, Latent Heat Powder Based on Paraffins and Waxes, Innovative PCM's and Thermal Technology Product Information, Rubitherm GmbH, Jul. 31, 2002, 2 pages.

Rubitherm® GR, Latent Heat Granulate Based on Paraffins and Waxes, Innovative PCM's and Thermal Technology Product Information, Rubitherm GmbH, Jul. 31, 2002, 2 pages.

PCM Thermal Solutions, Thermal Management Through the Use of Phase Change Materials (PCM's), TEAP Energy TEA 29 PCM Capsules, http://www.pcm-solutions.com/tea29.html, website accessed Apr. 12, 2004.

TH 29° C Phase Change Material (PCM), TEAP Energy, http://www.teappcm.com/teap_29c.html, website accessed Apr. 13, 2004.

Monthly Progress Report No. 6, Contract No. DE-FG03-86SF16308, covering Nov. 1986, DOE Solar Passive Division, University of Dayton Research Institute's investigation of PCM's.

Salyer, Ival O. et al., "Advanced Phase Change Materials and Systems for Solar Passive Heating and Cooling of Residential Buildings," Final Technical Report Covering the Period of May 29, 1986 though Jul. 15, 1988, University of Dayton Research Institute.

Allen et al., "Advances in Microsphere Insulation Systems", CEC C2-C-01, 2003, pp. 1-8.

Rosenbusch and Holcomb, "The Benefits of Microspheres", PCI, 2004, pp. 1-4.

Watkins, Lou, "New Pipeline Insulation Technogy [sic] Introduced", Pipeline & Gas Journal, Apr. 2002, pp. 1-2.

Hy-Tech Thermal Solutions, "Ceramic Paint Additive Makes any Paint Insulate", 2003-2004, pp. 1-4.

Therma-Guard, Trade Literature, May 5, 2005, pp. 106.

3M United States, 3M™ Glass Bubbles S32, Trade Literature, 1995-2005, pp. 1-2.

Eccotherm®, "Thermal insulation deepwater materials are used on manifolds, sleds, . . . ", Emerson Cuming Trade Literature, May 5, 2005, 1 page.

* cited by examiner

US 8,132,382 B2

INSULATION CONTAINING HEAT EXPANDABLE SPHERICAL ADDITIVES, CALCIUM ACETATE, CUPRIC CARBONATE, OR A COMBINATION THEREOF

CROSS-REFERENCE TO RELATED APPLICATIONS

The present application is a continuation-in-part of U.S. Ser. No. 11/195,055, filed Aug. 2, 2005, which in turn is a continuation-in part of U.S. application Ser. No. 10/869,994, filed Jun. 17, 2004 now abandoned.

FIELD OF THE INVENTION

The present invention relates to insulation products, and more specifically to loose fill insulation, batts and board products such as duct liner and duct boards, and methods of making the same.

BACKGROUND OF THE INVENTION

Thermal insulation for buildings and other structures is available in the form of mats, batts, blankets and loose fill. Mats, batts and blankets are flexible products containing randomly oriented fibers bound together with a binder, and are generally prefabricated before being brought to a construction site and installed. In contrast, loose fill thermal insulation includes a large number of discrete fibers, flakes, powders, granules and/or nodules of various materials.

Efforts have been made to reduce the thermal conductivity of insulation. See for example U.S. Pat. App. No. 2005/0025952, directed to heat resistant insulation composites and methods of preparing them; U.S. Pat. App. No. 2005/0079352, directed to expandable microspheres for foam insulation and methods for preparing same; U.S. Pat. No. 6,864,297, directed to composite foam materials made from polymer microspheres reinforced with long fibers; U.S. Pat. No. 6,638,984, directed to microcellular foams, their method of production and uses thereof; U.S. Pat. No. 5,418,257, directed to modified low-density polyurethane foam bodies; U.S. Patent Application Nos. 2003/0087576 and 2003/0040239, directed to infrared radiation absorbing and scattering material dispersed on insulation material

SUMMARY OF THE INVENTION

The present invention is directed to a fiber glass thermal insulation comprising randomly distributed inorganic fibers and about 5-500 wt. % (based on the weight of the inorganic fibers) expandable microspheres, comprising a polymeric shell having disposed therein a blowing agent or gas, said expandable microspheres increasing in size when heated.

The present invention uses expandable microspheres that are small spherical, preferably, plastic particles. The microspheres consist of a polymer shell encapsulating a blowing agent or gas, such as a hydrocarbon, and in particular, a paraffinic hydrocarbon, isobutane or isopentane. When the gas inside the shell is heated, it increases its pressure and the thermoplastic shell softens. This causes the shell to stretch and expand in much the same way as a balloon. There is a difference, in that, when the heat is removed, the shell stiffens, and the microsphere remains in its new expanded form. When fully expanded, the volume of the microspheres can increase to more than 40 times its original volume.

The shell can be made of a polymeric material, such as a co-polymer, e.g., vinylidene chloride, acrylonitrile and methylmethacrylate. The microspheres can be expanded anywhere between about 100° and about 200° C., depending on the grade.

In a further embodiment of the present invention, a method of making a thermal insulation product is provided in which inorganic fibers, such as glass fibers, and about 5-500 wt. % (based on the weight of the inorganic fibers) unexpanded hollow microspheres comprising a polymeric shell having disposed therein a blowing agent or gas. This material is disposed on a receiving surface to form a thermal insulation product precursor. The thermal insulation product precursor is then heated to expand a significant portion of the unexpanded hollow microspheres to increase their size. The precursor is then permitted to cool, to form the final thermal insulation product, whereby the now expanded microspheres improve the thermal insulation properties of the thermal insulation product.

In certain embodiments of the present invention, the insulation product can include rotary fibers, i.e., the fine glass fibers used in batt insulation and blowing wool or "loose fill" products, and adhesive, such as phenolic adhesive binder. The insulation product can be produced by an air laid process with textile fibers and powdered adhesive, or a rotary process in which a liquid adhesive is sprayed onto the fibers as they are accumulated onto a receiving belt, for example.

In one embodiment of the present invention, the expandable microspheres are disposed within a slurry which is deposited onto a thermal insulation product, or disposed onto the fibers of the insulation product prior to heating the insulation product in a curing oven, for example. The preferred slurry is designed to be absorbed into the thermal insulation product readily, so as to disperse the unexpanded microspheres uniformly throughout the product. Upon heating, the unexpanded microspheres expand into their final form while, optionally, also curing the thermosetting phenolic binder. Naturally, the carrier liquid of the slurry, e.g., water, evaporates in the curing oven to leave a dry product.

In another embodiment of the invention, a thermal insulation comprising randomly distributed inorganic fibers bound together with an adhesive binder is provided. The thermal insulation comprises about 5-500 wt. % (based on the weight of the inorganic fibers), expanded hollow microspheres having a diameter of about 20-150 microns. The expanded microspheres reduce the thermal conductivity of the thermal insulation by at least about 5%. Preferably, they are uniformly mixed or distributed among the inorganic fibers, and can be adhered to the inorganic fibers by an adhesive binder.

In a further embodiment of the present invention, an attic insulation is provided comprising a roof supported by a plurality of rafters. An attic floor containing a plurality of joists, adjacent ones of said joists forming the side of the cavity with a room ceiling forming a bottom of the cavity. The cavity is at least partially filled by a thermal insulation comprising randomly distributed glass fibers. At least about 5 wt. % hollow expanded microspheres having a diameter of about 20-150 microns is provided. These microspheres have been expanded from a diameter of about 6-40 microns. The hollow expanded microspheres reduce the thermal conductivity of the thermal insulation by at least about 5% and, more preferably, about 6.8-19.4%. In a further embodiment of the present invention, an attic insulation is provided comprising a roof supported by a plurality of rafters. An attic floor containing a plurality of joists, adjacent ones of said joists forming the side of the cavity with a room ceiling forming a bottom of the cavity. The cavity is at least partially filled by a thermal insulation comprising randomly distributed glass fibers. At least about 5 wt. % hollow expanded microspheres having a diameter of about 20-150 microns is provided. These microspheres have been expanded from a diameter of about 6-40 microns. The hollow expanded microspheres reduce the thermal conductivity of the thermal insulation by at least about 5% and, more preferably, about 6.8-19.4%.

In a further embodiment of the present invention, a fiber glass thermal insulation batt or board comprising a fiber glass layer containing randomly distributed glass fibers bound by a resinous binder is provided. The batt or board further comprises about 5-500 wt. % expanded microspheres, and a facing layer applied to the fiber glass insulation layer. The microspheres of this embodiment can be uniformly dispersed within the randomly distributed inorganic fibers, adhered to the facing layer, or mixed within the adhesive binder, for example. They can also be disposed within a bituminous mastic employed to join the facing layer to the fiber glass thermal insulation layer.

In still a further embodiment of the present invention, a fiber glass thermal insulation is provided comprising randomly distributed glass fibers bound by an adhesive material and at least about 5-500 wt. % hollow expanded microspheres containing a gas. The hollow expanded microspheres reduce the thermal conductivity of the fiber glass thermal insulation by at least about 5%. The hollow microspheres have a diameter of about 20-120 microns, and are mixed uniformly throughout the randomly distributed glass fibers. The hollow expanded microspheres can be expanded at a temperature of about 80-200° C. (176-392° F.).

In still a further embodiment of the present invention, a method of making a thermal insulation product is provided in which randomly distributed inorganic fibers and about 5-500 wt. % unexpanded hollow microspheres are provided. The unexpanded hollow microspheres comprise a polymeric shell having disposed therein a blowing agent or gas. The mixture is disposed onto a receiving surface to form a thermal insulation product precursor. The precursor is heated to expand a significant portion of the unexpanded hollow microspheres to increase their size, and then permitted to cool to form a thermal insulation product, whereby the now expanded hollow microspheres improve the thermal insulation properties. This method can employ, as the disposing step, a rotary spinning process in which glass is produced into a plurality of fibers and adhesively bonded together to form a thermal insulation product. Similarly, the disposing step can include air laying the glass-containing inorganic fibers and mixing the air laid glass containing inorganic fibers with a powdered adhesive. The heating step can include expanding a significant portion of the unexpanded hollow microspheres while also causing the powdered and/or liquid adhesive to cure.

In a still further embodiment of the invention, a thermal insulation is provided including randomly distributed inorganic fibers and about 5-500 wt. % (based on the weight of inorganic fibers), expanded microspheres, 5-500 wt. % calcium acetate, 5-500 wt. % cupric carbonate or 5-500 wt. % of a combination of these ingredients, for reducing the thermal conductivity (K-value, BTU-in/hr-ft$^2$—F) of the thermal insulation by at least about 1%.

BRIEF DESCRIPTION OF THE DRAWINGS

The accompanying drawings illustrate preferred embodiments of the invention, as well as other information pertinent to the disclosure, in which.

DETAILED DESCRIPTION

Loose Fill

Figure 1:
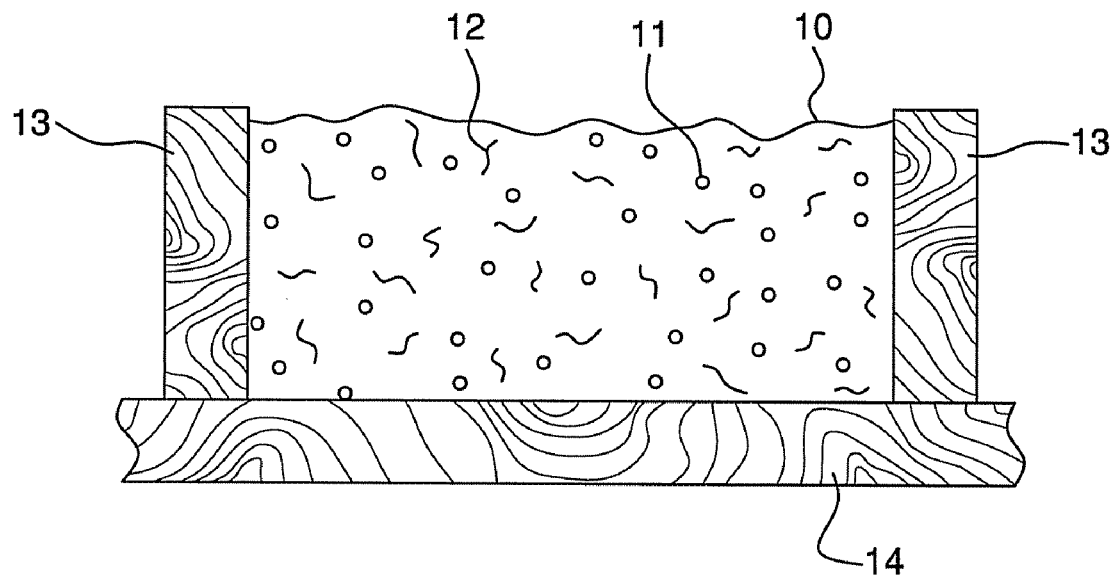
FIG. 1 illustrates loose fill insulation, including expanded microspheres, blown in an attic between a pair of joists.

FIG. 1 illustrates loose fill insulation 12, including expanded microspheres 11, blown in an attic 14 between a pair of joists 13, 13. With reference to FIG. 1, a loose fill insulation product 10 having expanded microspheres 11 dispersed therein is provided. As used herein, the term "microspheres" applies to microspheres such as those made from glass and polymers, and expandable or expanded microspheres. The loose fill insulation 12 can be in the form of fibers, flakes, powders, granules and/or nodules of various materials. The loose fill insulation 12 is of the type for insulating an interior of a hollow or open space in a building structure, e.g., a house, office, or other building structure. Preferably, the loose fill can be compressed during storage to save space, and then expanded or "fluffed-up" with air or another gas when poured or blown into a hollow wall or other empty space of a structure. The loose fill insulation 12 can include organic materials, inorganic materials or both. Examples of organic loose fill materials include animal fibers, such as wool; cellulose-containing vegetable fibers, such as cotton, rayon, granulated cork (bark of the cork tree), redwood wool (fiberised bark of the redwood tree), and recycled, shredded or ground newspaper fibers; and thermoplastic polymer fibers, such as polyester; and expanded plastic beads. Examples of inorganic and organic loose fill materials include diatomaceous silica (fossilized skeletons of microscopic organisms), perlite, fibrous potassium titanate, alumina-silica fibers, microquartz fibers, opacified colloidal alumina, zirconia fibers, alumina bubbles, zirconia bubbles, carbon fibers, granulated charcoal, paper, graphite fibers, rock fibers, slag fibers, glass wool and rock wool. The loose fill can include one or more varieties of loose fill material. In an exemplary embodiment, the loose fill insulation includes OPTIMA® fiberglass loose fill insulation available from CertainTeed Corporation, Valley Forge, Pa. In a further embodiment of the present invention, an attic insulation is provided comprising a roof supported by a plurality of rafters. An attic floor containing a plurality of joists 13, 13, adjacent ones of said joists 13, 13 forming the side of the cavity with a room ceiling forming a bottom of the cavity. The cavity is at least partially filled by a thermal insulation comprising randomly distributed glass fibers. At least about 5 wt. % hollow expanded microspheres having a diameter of about 20-150 microns is provided. These microspheres have been expanded from a diameter of about 6-40 microns. The hollow expanded microspheres reduce the thermal conductivity of the thermal insulation by at least about 5% and, more preferably, about 6.8-19.4%.

When manufactured and compressed during storage, the loose fill particles forming the compressed loose fill are dimensioned so as to have an equivalent sphere with a diameter generally smaller than 3 cm, preferably from 0.1 to 1 cm. In one embodiment, after the compressed loose fill is decompressed, expanded and processed through a blowing hose, the loose fill particles forming the expanded loose fill are each dimensioned so as to just fit within a sphere having a diameter of from 0.1 to 4 cm, preferably from 0.5 to 2 cm.

The thermal insulation product including the expanded microspheres 11 can be formed by dispersing, preferably uniformly, the expanded microspheres 11 in the loose fill 12 before or at the same time as the loose fill is poured or blown into an interior, empty space of a hollow or open object, such as a hollow wall (before application of the drywall) or an attic. Methods of pouring and blowing loose fill 12 are well known in the art and will not be repeated here in detail. Generally, blowing loose fill 10 involves feeding compressed loose fill 12 into a blower where it is mixed with a gas, such as air, expanded, processed through a blowing hose, and then blown into a hollow or open structure to form thermal insulation.

In certain embodiments, a mixture including one or more expanded or expandable microspheres 11, such as hollow plastic and glass microspheres, and a dry binder (i.e., an adhesive later activated by water or elevated temperatures at the time of installation of the loose fill) can be sprayed onto or otherwise mixed with the loose fill 12 before the loose fill 12 is compressed and/or when the loose fill 12 is decompressed. Also, a mixture including one or more microspheres 11 and a binder (i.e., an adhesive) can be mixed with the loose fill by spraying on the loose fill at or near the end of the blowing hose before the loose fill is installed in a hollow or open space. The binder serves to join and hold the microspheres 11 and the loose fill insulation together. The binder can be organic or inorganic. The organic binder can include an organic water based binder such as an acrylic latex or a vinyl acetate latex. The organic binder can also include a sprayed hot melt adhesive such as a thermoplastic polymer. The inorganic binder can include an inorganic bonding agent such as sodium silicate or a hydraulic cement, such as Plaster of Paris, gypsum, or the like. Evaporation of the liquid from the liquid mixture on the loose fill 12 results in a loose fill thermal insulation product 10 with the microspheres 11 and/or binder dispersed in the loose fill 12. In various embodiments, the microspheres 11 and the binder can be added to the loose fill 12 at the same time or at different times. A mineral oil can be used instead of or in addition to the binder for the purpose of dust reduction. In other embodiments, rather than providing the microspheres 11 in a liquid mixture, the microspheres 11 may be provided to the loose fill 12 in its liquid slurry state or as a powder and, optionally, along with a mineral oil and/or binder as described above. If the microspheres 11 have not yet been expanded, they should be heated after mixing with the loose fill 12, but prior to being blown into a building space. For example, the loose fill 12 could be heated before or after compression or in-line during the blowing operation so long as the fibers are permitted to cool prior to contacting flammable materials.

In one preferred embodiment, loose fill insulation is fed through a loose fill transport duct into a mixer to form a mixture of loose fill 12 and expanded microspheres 11. The expanded microspheres 11 may be provided, for example, in slurry or dry form. In certain embodiments, a dry binder (to be later activated by water, heat or other material during loose fill application) and/or mineral oil can also be added in the loose fill transport duct or added in and mixed in a mixer with the loose fill. The microspheres 11 and/or other material can be added directly to the mixer and/or to the loose fill transport duct. The mixture is then fed to a compressor/packager, where the mixture is compressed to remove air and increase density and packaged as compressed loose fill including the expanded or expandable microspheres.

Microspheres

Microspheres are small solid or hollow spheres with an average diameter in the range of 12-300 microns, preferably about 15-200 microns, and most preferably about 30-120 microns. Microspheres are commonly made of glass, and are desirably made hollow for their thermal and sound insulation qualities. Borosilicate or similar glass is preferred because of its insolubility in water. Alternatively, recycled amber container glass frit is also attractive, since it can be made into hollow glass amber spheres, without the addition of a sulfur-containing compound, since sulfur is a pre-existing constituent. A number of glass microsphere grades are available, in a range of wall thicknesses, strengths, and densities from under 10 pcf to over 20 pcf, preferably about 0.125-0.60 g/cc.

Glass macrospheres were created to overcome some of the limitations of glass microspheres. As their name suggests, macrospheres are relatively large, with most common diameters in the 0.125"-0.500" range. A wide selection is available of strengths and densities, in roughly the same range as glass microspheres. Macrospheres increase the overall packing factor to 70% or more, and are often less expensive than glass microspheres.

As the name implies, microspheres are small, spherical particles. Particle sizes range from 12 to 300 microns in diameter, and wall thickness can vary from several microns to as low as 0.1 micron. They can be composed of acrylonitrile, glass, ceramic, epoxy, polyethylene, polystyrene, acrylic, or phenolic materials. Because they are hollow, the true density of microspheres is lower than that of other non-soluble additives. The true density of hollow microspheres ranges from 0.60 g/cc to as low as 0.025 g/cc.

There are many potential applications for hollow glass microspheres. Sodium borosilicate hollow microspheres are often used as light-weight fillers of composite plastics for ship-building, aviation and car-making industries, sensitizing additives in manufacture of industrial explosives, varnishes, and paint fillers. In contrast to mineral and organic fillers, hollow microspheres are unique because they have a low density but high strength.

The production of hollow microspheres is a well-established technology. There are several methods available to produce hollow microspheres, but some methods depend on the decomposition of $CaCO_3$ (which decomposes to CaO and $CO_2$ gas), a substance known as a "blowing agent" to form a gas within in a liquid. The rapid expansion of this gaseous product causes the formation of a bubble. One of the most common methods for producing hollow microspheres is to intentionally mix a trace amounts of a sulfur-containing compound such as sodium sulfate with a sodium borosilicate glass that is similar in composition to traditional Pyrex® glassware. This mixture is then dropped into a hot flame that melts the powdered glass and sodium sulfate. The melting of sodium sulfate results in a decomposition reaction that releases minute amounts of sulfur gas that form bubbles within the molten glass droplets. (Sodium sulfate additions are not necessary when waste or virgin amber glass frit is used, since sulfur-containing compounds are mainly responsible for the amber color of the glass and are already present.) The hollow droplets are then rapidly cooled from the liquid state to form hollow microspheres. As previously mentioned, such an approach relies on the intentional addition of a sulfur-containing compound to the glass.

Microspheres have found use in many applications over the years. They are widely used in the fiber-reinforced polyester industry to improve the manufacturing process of shower stalls and boats. Lighter, more-durable fiberglass products are a direct result of the creative use of microspheres. Thick-film ink, mining explosives, and rubber and plastic products of all descriptions are just a few other examples of the many products that are made better with these versatile materials. The benefits derived by these diverse end uses vary—some are unique to a specific industry, while others are common goals shared by many manufacturers.

Likewise, certain types of microspheres may offer a particular set of advantages, and a formulator must carefully select from the many products available in order to obtain the best results. For example, the compressible nature of plastic microspheres is a unique feature that is suited to elastomeric products, while glass microspheres are ideal for areas involving high temperatures and/or chemical resistance.

Plastic Microspheres

Developed in the 1970s, thermoplastic microspheres are compressible, resilient, hollow particles. The extremely thin shell wall possible with plastic spheres results in specific gravities as low as 0.025 and allows just a small weight-percent of these materials to displace large volumes when disposed in matrices. Because the resilient plastic can deform under stress, there is virtually no breakage when mixing or pumping these products, even with high shear mixing, as in the case of blowing loose fill insulation. Additionally, the compressible nature of plastic can absorb impacts that might ordinarily deform the finished product, thereby reducing damage caused by stone chips, foot traffic or freeze-thaw cycles.

Glass Microspheres

Glass bubbles were developed in the 1960s as an outgrowth from the manufacture of solid glass beads. Since they are made of glass they provide the benefits of high heat and chemical resistance. The walls of glass bubbles are rigid. Products are available in a broad range of densities from as low as 0.125 g/cc to 0.60 g/cc. The collapse strength of the glass bubble is directly related to the density, i.e., the higher the density, the higher the strength. For example, a glass bubble with a density of 0.125 g/cc is rated at 250 psi, whereas one with a density of 0.60 g/cc is rated at 18,000 psi. In order to minimize both the cost and the weight of the final product, the appropriate glass bubble is the one that is just strong enough to survive all of the manufacturing processes and the end use of the product.

Since microspheres are closed-cell, gas-filled particles, they are extremely good insulators. This characteristic is imparted to materials that contain microspheres, such as batts, boards and loose fill insulation products. As this invention demonstrates, thermal insulation properties of batts, loose fill, facings, coatings or substrates can be improved by the addition of microspheres, calcium acetate and/or cupric carbonate.

Physical Properties and Composition

3M Type K1 microspheres are manufactured from soda-lime-borosilicate glass and is the most economical 3M microsphere product at about $0.40 per liter. TABLES 1 and 2, below, contain selected properties of Type K1 microspheres. Trapped within the microspheres are residual gases consisting of a 2:1 ratio of $SO_2$ and $O_2$ at an absolute pressure of about ⅓ atmosphere.

Alternative glass bubbles to the Type K1 microspheres are produced by 3M and also by Emerson & Cuming. Options include a floating process that skims off low density (weak) bubbles and removes a portion of the condensed salts. A coating of methacrylic chromic chloride is then applied that minimizes water pickup. The overall specific surface area is about half that of the Type K1 microspheres, which may allow reduced bake-out requirements due to lower water adsorption capacity. The use of thicker-walled bubbles will benefit applications where microspheres are exposed to intense localized forces.

TABLE 1*

Thermal performance of 3M Type K1 microspheres

| COLD VACUUM PRESSURE (torr) | APPARENT THERMAL CONDUCTIVITY (mW/m-K) | COMPARATIVE THERMAL PERFORMANCE |
|---|---|---|
| $1 \times 10^{-3}$ | 0.7 | 7.0 times worse than multi-layer insulation |
| $1 \times 10^{-1}$ | 1.4 | 3.3 times better than perlite |
| 760 | 22 | 1.5 times better than polyurethane |

*M. S. Allen et al., "Advances in Microsphere Insulation Systems", 2003 Cryogenic Engineering Conference.

TABLE 2*

Selected properties of 3M Type K1 microspheres

| True density | 0.125 g/cc (7.8 lb/ft$^3$) |
|---|---|
| Bulk density (@ 60% packing factor) | 0.075 g/cc (4.7 lb/ft$^3$) |
| Particle size (mean/range) | 65/15-125 microns |
| Isostatic crush strength | 1.7 MPa (250 psi) |
| Maximum operating temperature | 600° C. |
| Specific surface area | 0.2 m$^2$/cc of bulk volume |

*M.S. Allen et al., "Advances in Microsphere Insulation Systems", 2003 Cryogenic Engineering Conference.

Expandable Microspheres

The invention preferably employs about 5-500 wt. % (based on the weight of the inorganic fibers, such as glass fibers) unexpanded or expanded hollow microspheres. An unexpanded microsphere generally consists of a thermoplastic shell encapsulating a blowing agent or gas, such as paraffin, or a hydrocarbon, such as isobutane or isopentane. When the thermoplastic shell is heated, it softens and, at the same time, the pressure of the gas or blowing agent increases. This causes the shell to stretch and expand in much the same way as a balloon. There is a difference between a balloon and/or an expanded microsphere in that, when the heat is removed, the shell of the expanded microsphere stiffens and the microsphere remains in its new expanded form. As is well known, when the air inside a balloon cools, the balloon shrinks. When the expandable microsphere is heated, it is then called an "expanded" microsphere.

The insulation products of this invention can be in the form of loose fill, batt, duct liner, or duct board, for example. They can be made with a phenolic binder, or treated with sizing and binder, as in a rotary process. The binder can be in liquid or powder form and, optionally, can contain expanded or unexpanded microspheres. The microspheres can be dry mixed into the fibers of the insulation product, or immersed into a slurry which, in turn is absorbed into the insulation product. The microspheres of this invention generally have an unexpanded diameter between about 6 and 40 micrometers, depending on the grade. When unexpanded microspheres are heated, they expand to about 20-150 micrometers in diameter.

The preferred microspheres of this invention have two major components: the shell and a gas or blowing agent. The gas or blowing agent inside the shell is usually isobutane or isopentane. The shell is typically a co-polymer of some monomers, e.g., vinylidene chloride, acrylonitrile, and methylmethacrylate. Typically, the microspheres are introduced into the thermal product, and then the product is heated to a temperature at which the microspheres start expanding. This can be anywhere between about 80° and 200° C., preferably about 100° to about 200° C., depending on the grade. The grade depends on whether or not the insulation product will be heated after the microspheres have been added, and if so, to which temperature, and for how long. It also depends on if the formulation is water borne, solid-based, or dry. Typically, if there is not heating involved in the process after the microspheres are introduced, pre-expanded microspheres are used. Microspheres can be delivered dry or wet (containing water) in the following forms: wet unexpanded, dry unexpanded, a dispersion of about 40% microspheres in a water slurry, a master batch with about 65 wt. % microspheres, wet expanded or dry expanded. In general, wet expanded and wet unexpanded microspheres are used in products where there is already water present, or water will be evaporated in the process, while dry unexpanded and dry expanded microspheres are used in products that have no water. Master batch microspheres are typically used in extrusion and injection molding, while wet unexpanded and dry unexpanded microspheres are used where the process includes heating. Wet expanded and dry expanded are used in processes that do not always include heating. It is relatively important that the matrix of the thermal insulation be able to flow, move, or be plastically deformed at the temperature at which the microspheres start to expand. Most forms of glass or inorganic fibrous insulation products meet these criteria.

Typically, unexpanded microspheres have to be heated in order for them to expand. In some cases, however, where there is an exothermic reaction involved, the energy released by this reaction increases the temperature of the product sufficiently to expand the microspheres on its own, without external forms of heat. It is possible to stop and continue expansion several times, as long as the matrix is not changed in a way that would inhibit the expansion of the microspheres.

Expandable microspheres used in connection with the thermal insulation of this invention can be selected from the variety of Expancel® microspheres, available through Expancel® division of Akzo Nobel. Expancel® products 093DU120, 820DU40, 820SLU80, and 820SLU40, are examples of expandable microspheres useful for this invention.

Fiberglass Thermal Insulation Batts and Boards

Figure 2:
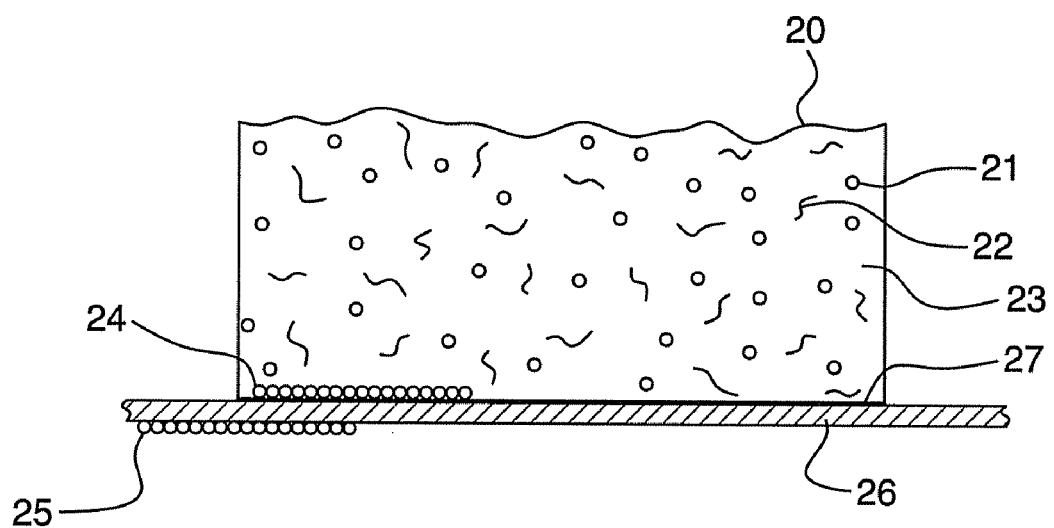
FIG. 2 illustrates an insulation batt having expanded microspheres in three different locations.

As shown in FIG. 2, fiberglass thermal insulation batts 20, blankets, semi-rigid and rigid boards, such as duct boards, duct liners, and the like, can be manufactured using the materials provided by this invention. In a further embodiment, a batt 20 is manufactured with a fiberglass insulation layer 23. The fiberglass insulation layer contains randomly distributed inorganic fibers such as glass fibers and contains about 5-500 wt. % microspheres 21, 24 or 25, 5-500 wt. % calcium acetate, 5-500 wt. % cupric carbonate or a combination of these, which can be randomly distributed among or on the inorganic or glass fibers 22. Alternatively, the microspheres, calcium acetate, and/or cupric carbonate, can be adhered to the top or bottom layer of the insulation layer 23, randomly distributed or mixed with an adhesive 27, such as a resinous adhesive like powdered phenolic binder, or bituminous mastic, often used to apply a facing to a conventional fiberglass batt insulation, or disposed within acrylic, epoxy, polyester or poly-vinyl-alcohol resinous compositions, or latex emulsions, dry powder, fibers, or solvent-based compositions. The facing 26 can be applied to one or both major surfaces of the insulation layer 23, or can be applied to envelope the insulation layer 23. Still further, the microspheres 24 or 25, calcium acetate, and/or cupric carbonate, can be adhered or made integral with the facing 26, such as by spraying, ink jet printing or using a roll to apply an adhesive layer followed by applying the microspheres, or applying them as a slurry in such a process. When applied to the facing, a uniform covering of microspheres 24 or 25, calcium acetate, and/or cupric carbonate, is desirable, but the weight percentage of all, or at least one of said ingredients, may be less than 5%, such as 0.5-3%, based upon the weight of the fibers or the facing 26. Alternatively, the microspheres, calcium acetate, and/or cupric carbonate, may be applied to the top surface of the fiberglass insulation 23 by use of a binder or adhesive, or by concentrating these materials in a layer or region near the surface or in the middle of the insulation layer 23.

Example 1

Samples of 12"×12" fiberglass were cut at approximately 1" thick. Materials tried are shown in Table 3 below. Samples were initially weighed dry. The material to be investigated was added to water to make a mixture. The fiberglass samples were then soaked in the mixture to distribute the microcapsules and other materials.

The samples treated with Expancel® were dried at 50° C., then expanded in an oven at 115° C. for about 15 minutes. All others were dried at 50° C. only.

Thermal conductivities of dry samples were measured at 0.9" before adding material. Data in the table for k (after) BTU-in/hr-ft$^2$—F, may have been normalized to 0.9" thickness because of over-expansion due to foam or because they did not recover back to 0.9". The exception is the sample with 22.37 (g) weight and 30% Expancel, where both the before and after thermal conductivities were measured at 0.9" directly.

TABLE 3

Testing of different materials for possibly enhancing thermal performance of fiberglass.

| Material added to fiberglass | Wt. of 12" × 12" dry fiberglass sample (g) | % added | k (before) BTU-in/hr-ft$^2$ - F. | k (after) BTU-in/hr-ft$^2$ - F. | Reduction in thermal conductivity (%) |
|---|---|---|---|---|---|
| Expancel ® 820-SL-80 (80 micron ave. cell) | 18.2 | 257 | 0.3370 | 0.2716 | 19.4 |
| Expancel ® 820-SL-80 (80 micron ave. cell) | 15.8 | 114 | 0.318 | 0.274 | 13.8 |
| Expancel ® 820-SL-80 (80 micron ave. cell) | 22.37 | 30 | 0.2967 | 0.2707 | 8.8 |
| Expancel ® 820-SL-40 (40 micron ave. cell) | 17.71 | 217 | 0.3083 | 0.2684 | 12.9 |
| Cupric Carbonate (mixed well when dried) | 18.2 | 28 | 0.307 | 0.286 | 6.8 |

TABLE 3-continued

Testing of different materials for possibly enhancing thermal performance of fiberglass.

| Material added to fiberglass | Wt. of 12" × 12" dry fiberglass sample (g) | % added | k (before) BTU-in/hr-ft² - F. | k (after) BTU-in/hr-ft² - F. | Reduction in thermal conductivity (%) |
|---|---|---|---|---|---|
| Calcium Formate (material dried as skin) | 16.24 | 56 | 0.312 | 0.330 | — |
| Ammonium Bicarbonate* | 20.03 | 0 | 0.300 | 0.300 | — |
| Calcium Acetate (material dried as skin) | 15.6 | 50 | 0.3297 | 0.3236 | 1.85 |
| Potassium Phosphate | 14.4 | 70.4 | 0.3282 | 0.3508 | — |

*Ammonium Bicarbonate decomposed when exposed to 50° C. to dry the sample

Heat expandable microspheres, 6 microns to 40 microns in diameter and composed of a polymer shell surrounding a blowing agent or gas, calcium acetate, and/or cupric carbonate additions, are introduced into fiber glass insulation in slurry form, or injected into the hot mineral fibers in the forming section of a typical glass batt manufacturing operation, for example. When expandable microspheres are employed, the insulation and microspheres are exposed to heat in the curing oven where the blowing agent expands and the polymer shell softens causing the microsphere to increase in size to between 20 and 150 microns in diameter. The slurry of unexpanded microspheres such as Expancel® 820SL40 and 820SL80, calcium acetate, and/or potassium phosphate, may also be mixed into the phenolic binder and sifted, mixed or sprayed onto fiber glass fibers. The intermingled matrix of fibers, binder, calcium acetate, cupric carbonate and/or microspheres are collected on a conveyor and transported through a curing oven where the insulation matrix is dried, the binder is cured and/or cross-linked, and the microspheres expanded, preferably simultaneously. The formed fiber glass loose fill mat, batt or board is subsequently cut to size and packaged. The addition of the microspheres reduced the thermal conductivity of the insulation samples by about 12.3% on average, as shown in Table 3. The addition of about 5-500 wt. % calcium acetate, and or 5-500 wt. % cupric carbonate has been shown in our examples to reduce thermal conductivity by about 1-7% on average. These latter materials can be applied as a coating, flakes, granular material, or as a liquid, for example.

From the foregoing, it can be realized that this invention provides improved loose fill insulation, and batts and boards which include expandable or expanded microspheres, calcium acetate, and/or cupric carbonate for increasing the thermal insulation efficiency. These materials can be distributed among glass fibers, cellulosic particles, or adhered to facing layers or glass fibers, for example, to provide a great variety of more efficient thermal insulation products. The glass and polymeric spheres of this invention also possibly assist in sound deadening and may assist in allowing loose fill insulation to flow through hoses used for blowing such products into attic cavities and wall spaces. Although various embodiments have been illustrated, this is for the purpose of describing, but not limiting the invention. Various modifications which will become apparent to one skilled in the art, are within the scope of this invention described in the attached claims.

What is claimed is:

1. A thermal insulation product capable of being blown into place, consisting of:
   randomly distributed, loose inorganic fibers that are compressible to remove air and expandable by being mixed with air, and a combination of: 5 wt. %-500 wt. % calcium acetate particles based on the wt. % of the fibers and 5 wt. %-500 wt. % cupric carbonate based on the wt. % of the fibers and 5 wt. %-500 wt. % heat expandable, hollow microspheres based on the wt. % of the fibers; and each of the microspheres comprising a polymeric shell having therein a blowing agent or gas.

2. The insulation product of claim 1 wherein said microspheres are heat expandable to a diameter of about 20-150 microns from a diameter of about 6-40 microns.

3. The thermal insulation product of claim 1 wherein said microspheres have a polymeric shell selected from the group consisting of: vinylidene chloride, acrylonitrile, methylmethacrylate, or a combination thereof.

4. An insulated attic, comprising:
   a plurality of joists, and a thermal insulation between the joists, the thermal insulation consisting of randomly distributed glass fibers being mixed with air, and a combination of 5 wt. %-500 wt. % calcium acetate based on the wt. % of the fibers and 5 wt. %-500 wt. % cupric carbonate based on the wt. % of the fibers and 5 wt. %-500 wt. % heat expanded, hollow microspheres based on the wt. % of the fibers, the microspheres being heat expandable to a diameter of about 20-150 micron from about 6-40 microns diameter.

5. The insulated attic of claim 4 wherein said hollow microspheres are distributed within said glass fibers.

6. A thermal insulation, consisting of:
   randomly distributed glass fibers being mixed with air, and, based on a weight percent of the glass fibers, at least about 5-500 wt. % of calcium acetate or cupric carbonate, hollow microspheres containing a heat expandable gas, and a binder adhering said calcium acetate or cupric carbonate and hollow microspheres to corresponding glass fibers.

7. The thermal insulation of claim 6 wherein said microspheres are heat expanded and possess materials being heat expandable at a temperature of about 80-200° C. (176-392° F.).

8. The thermal insulation of claim 6 wherein said microspheres are heat expanded to a diameter of about 20-150 microns from a diameter of about 6-40 microns.

9. The thermal insulation of claim 6 wherein said microspheres have a polymeric shell selected from the group consisting of vinylidene chloride, acrylonitrile, methylmethacrylate, or a combination thereof.

* * * * *